United States Patent

[11] 3,547,152

[72] Inventor Louis R. Hess
Bell, Calif.
[21] Appl. No. 777,836
[22] Filed Nov. 21, 1968
[45] Patented Dec. 15, 1970
[73] Assignee Pacific Air Products
Bell, Calif.
a corporation of California

[54] PRESSURE SEALED DAMPER
13 Claims, 9 Drawing Figs.

[52] U.S. Cl. ................................................. 137/601;
98/110; 251/160, 251/175
[51] Int. Cl. .................................................. F16k 11/14
[50] Field of Search ........................................ 137/601,
599, 512.1; 251/160, 175; 98/110—113

[56] References Cited
UNITED STATES PATENTS
2,613,940 10/1952 Smith ............................ 137/599
2,759,697 8/1956 Harza ............................ 251/175X
2,970,803 2/1961 Harza ............................ 251/175
3,084,715 4/1963 Scharres ....................... 137/601
3,377,047 4/1968 Scholl ........................... 251/175

Primary Examiner—Robert G. Nilson
Attorney—Fulwider, Patton, Rieber, Lee and Utecht ABSTRACT: A damper controlling a flow of air through a duct and having two hollow rectangular blades rotatably mounted in a frame to turn from edge-to-edge closed positions to parallel open positions. The longitudinal tips of the blades are portions of flexible tubes seated in grooves extending along the edges of the blade, and the ends are longitudinally movable extensions having pistons telescoped into the blade and having sealing ribs engageable with the frame. When the damper is closed, the pressure on the upstream side is applied through the interior of each blade to expand the tips and extend the sealing ribs. The bodies of the blades comprise identical extruded plates with interlocked webs holding the plates together.

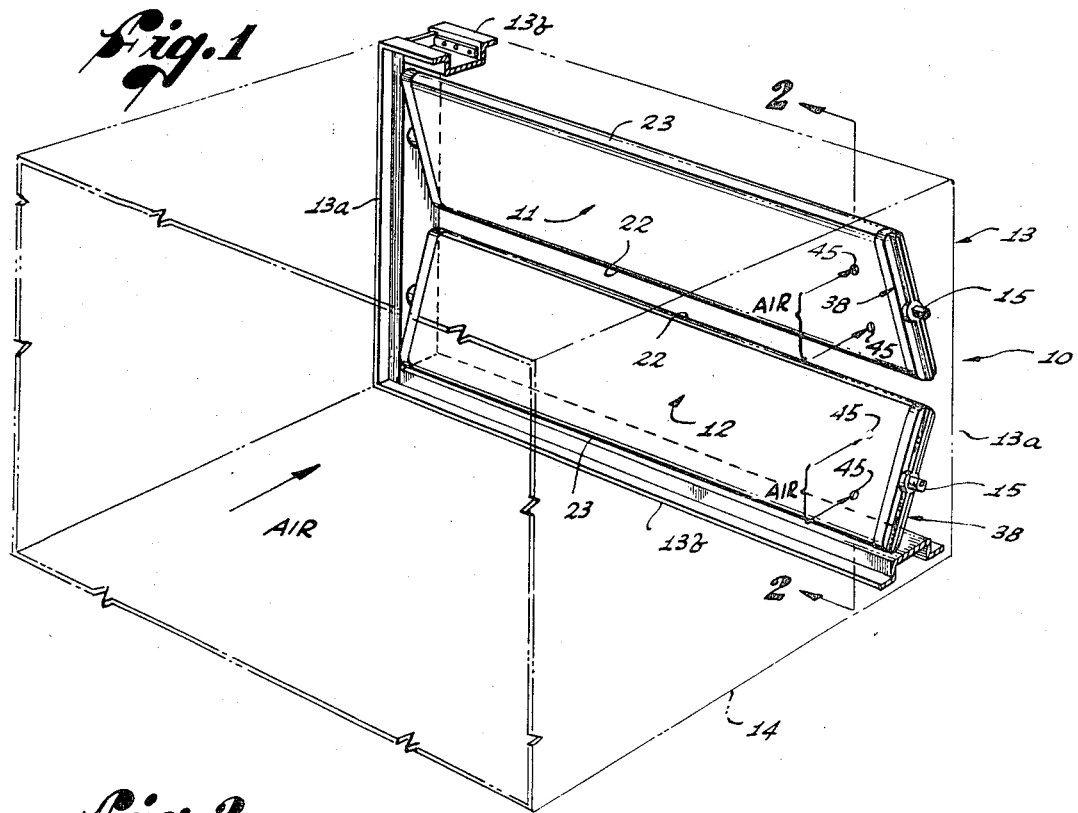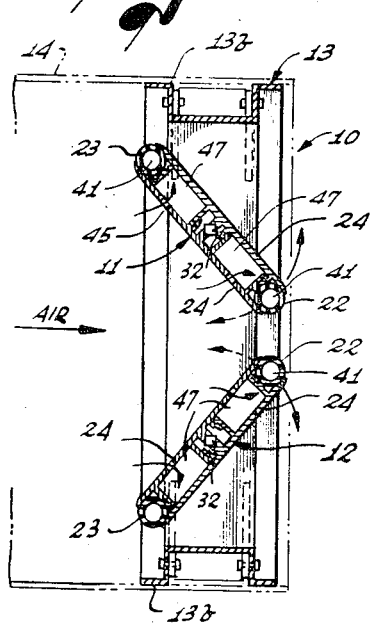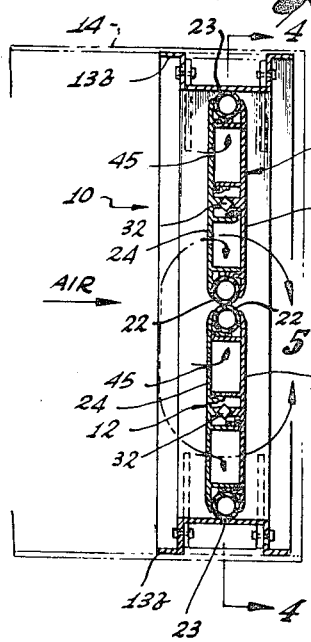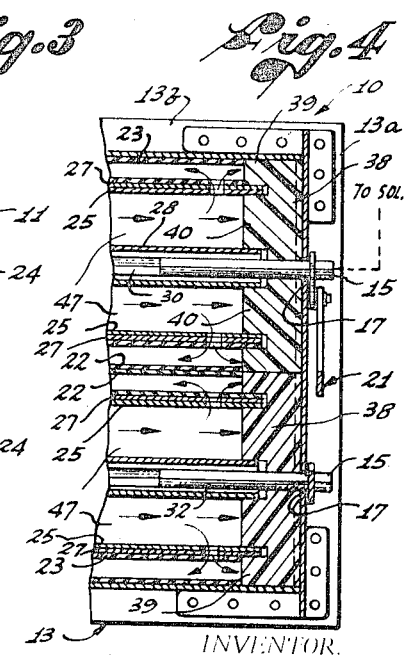
INVENTOR.
LOUIS R. HESS
BY Fulwider, Patton, Rieber, Lee, and Utecht
ATTORNEYS

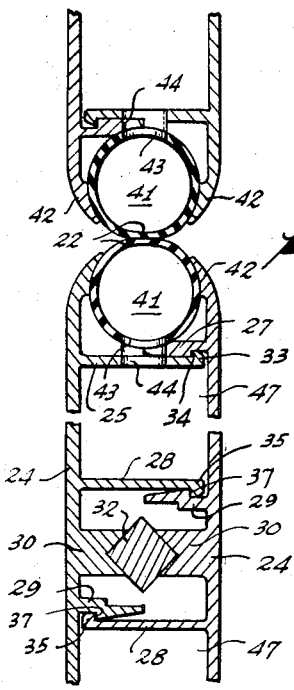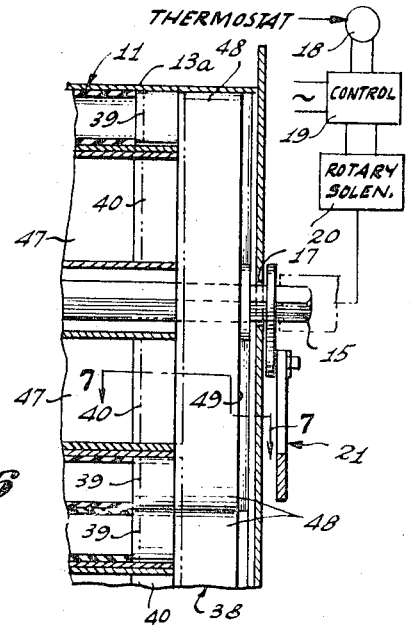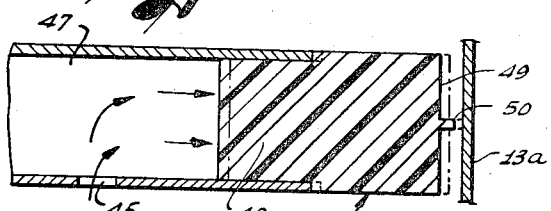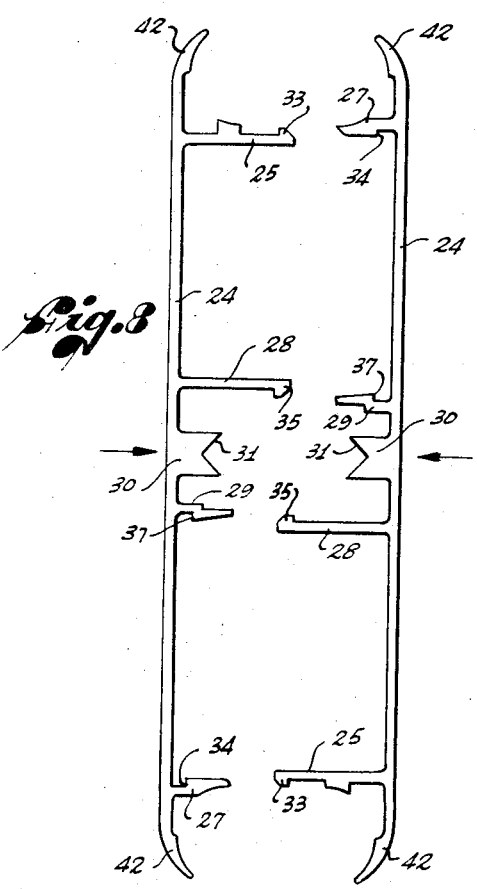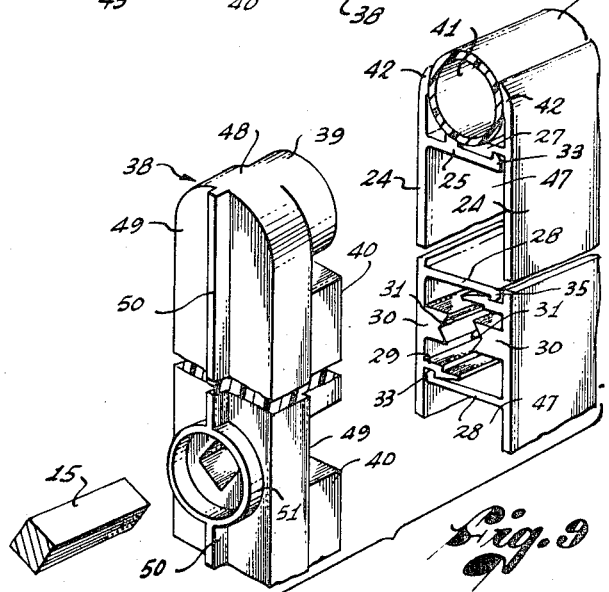

3,547,152

1

PRESSURE SEALED DAMPER

BACKGROUND OF THE INVENTION

The invention relates to a damper assembly for controlling a flow of air or other gas through a duct, and has particular reference to dampers of the type having one or more elongated and generally flat blades extending across the duct and each mounted to turn in a frame from a closed position in a transverse plane, usually perpendicular to the flow in the duct, to a fully open position in a plane parallel to the flow.

When more than one such blade is used, the blades are turned in unison to different angular positions providing the desired total flow area through the damper, and are moved into edge-to-edge relation in a common plane when the damper is closed. A prior assembly of this general type is shown in U.S. Pat. No. 3,084,715 wherein it may be seen that the blades have been made with resilient walls along the side edges or tips that are compressed against the similar walls of the other blades in the closed position. A resilient strip was incorporated in a special frame around the blades to form a peripheral seal augmented by system pressure, thereby limiting leakage around, as well as between, the blades.

SUMMARY OF THE INVENTION

The general object of the present invention is to provide a new and improved damper assembly of the foregoing general character in which system pressure is utilized in a novel manner to obtain highly effective sealing, both between the blades and at the ends when the damper is closed, and in which the need for a specially formed sealing frame is eliminated. More specifically, the invention provides a unique damper blade having tips that are expanded into tight sealing engagement with an adjacent blade or an adjacent frame surface by system pressure applied from within the blade when the damper is closed, and also having sealing elements on its ends in the form of longitudinally movable extensions of the blade supported by pistons which also are actuated by system pressure to extend the elements into tight sealing engagement with the frame when the damper is closed.

The invention also resides in the novel manner of mounting the sealing elements on the blade, in the special configuration and mounting of the end elements for amplification of the actuating pressure to produce sealing pressure higher than system pressure at the ends of the blade, and in the special configuration of the blade body itself for mass production and ease of assembly.

Other objects and advantages of the invention will become apparent from the following detailed description, taken in conjunction with the accompanying drawings.

BRIEF DESCRIPTION OF THE DRAWINGS

FIG. 1 is a perspective view of a damper assembly embodying the novel features of the present invention and shown in a partially open condition, part of an associated air duct being shown in broken lines, and part of the damper frame being broken away and shown in cross section.

FIG. 2 is an enlarged fragmentary cross-sectional view taken substantially along the line 2-2 of FIG. 1.

FIG. 3 is a view similar to FIG. 2 but showing the damper in the closed condition.

FIG. 4 is a fragmentary cross section taken substantially along the line 4-4 of FIG. 3.

FIG. 5 is an enlarged break away view of the portion of FIG. 3 within the arc 5.

FIG. 6 is a an enlarged view of parts shown in FIG. 4 shown before end sealing is completed, with elements of a positioning control system shown schematically.

FIG. 7 is an enlarged fragmentary cross section taken substantially along the line 7-7 of FIG. 6, the sealed position of the parts being shown in broken lines.

2

FIG. 8 is an enlarged end view of the sidewalls of a damper blade prior to assembly of the blade.

FIG. 9 is an exploded fragmentary perspective view of an end sealing elm element and the adjacent end portion of the blade.

DETAILED DESCRIPTION

As shown in the drawings for purposes of illustration, the invention is embodied in a damper 10 comprising two elongated and generally flat rectangular blades 11 and 12 extending across a rectangular opening in a frame 13 which is mounted in a duct 14 for carrying a flow of air or other gas to be controlled by the damper. The blades are rotatably supported at their ends to turn about parallel longitudinal axes from edge-to-edge closed positions in a common plane perpendicular to the direction of flow through the duct, to fully open positions in spaced planes parallel to the flow, and may be turned to different intermediate, partially open positions providing different total flow areas through the damper. With a given supply pressure, the damper thus may be set for a wide range of controlled flow rates, typically to maintain a selected temperature level in a room space by delivering conditioned air at a varying rate to the space.

Herein, the two blades 11 and 12 are identical in size and shape, each covering one-half of the damper opening when in the closed positions and are supported on trunnions 15 projecting from the ends of the blades, along the longitudinal axes thereof, through bearing openings 17 in the frame 13. The latter is formed by vertical side members 13a and horizontal top and bottom members 13b suitably fastened together at the corners and herein comprising simple channel-shaped metal bars with the channels facing outwardly and with flat inside surfaces defining the damper opening. 12 As shown in FIG. 6, the position of the damper blades 11, 12 may be controlled by a thermostat 18 located in the controlled room space and actuating a suitable control 19 for a rotary positioning actuator 20. The actuator is a solenoid that is connected to one of the trunnions 15 to position the associated blade 11, and the motion of this blade is reversed and transmitted to the other blade 12 through a conventional linkage 21, partially shown in FIGS. 4 and 6, which turns the other blade equally but oppositely in unison with the first blade. Thus, the adjacent longitudinal tips 22 of the blades swing down stream from the closed position to open a central slot of variable width between the blades, while the upper tip 23 of the upper blade 11 and the lower tip 23 of the lower blade 12 swing upstream and away from the top and bottom frame members 13b to open slots above and below the blades. When the damper is fully open and the blades are disposed in horizontal planes, substantially all of the area of the damper opening is effective flow area.

Each blade 11, 12 has an elongated hollow body formed in a novel manner by two generally rectangular sidewalls 24 (see FIGS. 5, 8 and 9) disposed in spaced parallel planes and joined together by four pairs of interlocked internal webs perpendicular to the sidewalls, two outer pairs of webs 25 and 27 being adjacent to the tips of the blade and two inner pairs of webs 28 and 29 being adjacent, and on opposite sides of, the axis of the blade. In addition, two aligned longitudinal ribs 30 are formed along the center of the inside face of each sidewall with opposed sides formed with V-shaped grooves 31 cooperating to define a seat of square cross section for receiving a longitudinal shaft 32 of square cross section. The opposite end portions of this shaft constitute the trunions 15 for the blade.

The sidewalls 24 of each blade 11, 12 preferably are extruded plates of suitable material such as aluminum, and herein are identically formed for assembly in inverted relation so that the two webs 25 are disposed adjacent the opposite side edges of the respective sidewalls and each is aligned with a web 27. As will be seen in FIG. 8, the webs 25 adjacent the upper edge of the left sidewall and adjacent the lower edge of the right sidewall are identical and are formed with longitudinal locking ribs 33 along their free edges, while the aligned webs 27 have shoulders 34 for interfitting with the ribs 33 as the sidewalls are moved together from the disassembled condition shown in FIG. 8. The ends of the webs 27 are rounded and the ends of the webs 33 are beveled to cooperate in deflecting each other momentarily, as permitted by the limited flexibility of the material, and then to snap into securely interlocked condition. Similarly, the centrally located webs 28 have ribs 35 for interlocking with shoulders 37 on the aligned webs 29, and are formed with beveled edges assisting these webs in deflecting while moving into interlocked condition. Thus, the body of each blade comprises two identical extrusions that are interlocked together in a very simple assembly operation involving only the positioning of the two sidewalls in side-by-side relation, and the pressing of the sidewalls together into interlocked relation.

In accordance with a primary aspect of the invention, a sealing element 38 is mounted on each end of each blade body for longitudinal movement toward and away from the frame 13, and is supported by pistons 39 and 40 which are exposed to system pressure inside the blade when the damper 10 is closed, thus operating to extend the sealing elements and seal the spaces between the blade ends and the frame. Moreover, the tips 22 and 23 of the blades are formed as the outwardly expandable walls of pressure chambers 41 within the blade, these chambers also being subjected to system pressure when the damper is closed closed so as to expand or bulge the tips into tight sealing engagement with the top and bottom frame members 13b and with each other between the blades. Accordingly, the entire damper is sealed tightly by close-fitting elements that that are pressed together by forces developed by system pressure and applied from within the blade.

In this instance, the tips 22, 23 are the exposed curved sides of hollow tubes composed of flexible material such as neoprene or the like that are fitted into longitudinal grooves defined in the blade body between the free edge portions 42 (FIGS. 5, 8 and 9) of the sidewalls 24, beyond the interlocked webs 25 and 27 which form the bottoms of the grooves. The tubes are coextensive in length with the sidewalls which, as shown most clearly in FIG. 5, are curved toward each other to converge around the tubes to a spacing less than the diameter of the tubes to hold the latter firmly against the ribs 25 and 27. This leaves the curved outer side of each tube exposed and extending beyond the edges of the sidewalls to form the tip of the blade body, with the interior of each tube constituting the pressure chamber 41 inside the exposed and flexible tip wall. If desired, a longitudinal sealing rib or ribs (not shown) may be formed on the exposed portion of the tube to concentrate the sealing pressure along a relatively thin line of contact.

To apply system pressure to the tip chambers 41, one or more ports 43 (see FIG. 5) are formed in the inner side portion of each tube and communicate with the interior of the blade body through aligned ports 44 in the interlocked ribs 25 and 27, and inlet ports 45 (FIG. 1—3) are formed in the upstream sidewalls of each blade to apply system pressure to a chamber defined by the interior of the blade when the damper is closed. It will be seen that the four sets of interlocked ribs divide the blade into a longitudinally partitioned chamber 47, and at least one inlet port 45 opens into each section of the chamber.

The end sealing elements 38 comprise extension bars of the same cross-sectional shape as the blade body, including curved tips 48 flush with the flexible tips 22, 23 and formed with flat end walls 49 parallel to the side members 13a of the frame. Adjacent each tip 48 of the extension bar, a cylindrical stud extends from the bar into the open end of the adjacent tube with a close sliding fit to form a piston 39, and two rectangular blocks are formed on the bar to extend into the open end of the internal chamber 47 of the blade body to form the pistons 40. Accordingly, the two studs and the two blocks movably support each extension bar on the blade body and are exposed to the pressure within the chambers 41 and 47.

On the exposed end wall 49 of each extension bar 38 is a sealing rib having straightened sections 50, extending from the tips 48 toward the center, and also having a central annular portion 51 that joins the two end sections together around the trunnions 15. This rib has a flat end surface lying in a plane parallel to the adjacent frame member 13a *so as to be movable into flat sealing relation with the frame. In addition, the sealing rib is composed of resiliently compressible such as neoprene or suitable plastic for providing an effective seal in response to the actuating force produced by the pressure within the tubes and the blade body and acting on the ends of the pistons. Preferably, the entire end sealing unit is moulded as a single integral piece, as indicated in FIGS. 7 and 9, and the rib is positioned to remain closely adjacent the frame even when the damper is open.*

It should be noted that the total exposed surface area of the studs 39 and the blocks 40 within the chambers 41 and 47 is substantially greater than the area of the flat end of the sealing rib 50, 51. Accordingly, the actuating pressure applied to the sealing element is concentrated in the sealing rib to produce a sealing pressure between the rib and the frame that is greater than the actuating pressure.

Damper assembles embodying the novel features of the present invention may be made with only one blade, in which case the tips seal against the top and bottom frame members 13b, and also may be made with more than two blades, as is well understood by those skilled in the art. With the illustrative double-blade damper 10 in the partially open condition shown in FIGS. 1 and 2, air will flow in the duct 14 and through the damper at a rate determined by the supply pressure level and by the total open area through the damper, substantially less than one-half the total area of the frame opening as illustrated in FIG. 1.

When the damper is to be closed, the two blades 11, 12 are turned to the position shown in FIGS. 3—5 in a common plane, bringing the adjacent tips 22 together between the blades and the opposite tips 23 into engagement with the top and bottom frame members 13b. Thus, the blades substantially close the damper opening, except for the leakage that might occur between the blade tips and around the blade ends as a result of imperfect closure, the end gap being shown on an exaggerated scale in FIG. 6.

As a result of the nearly complete blocking of the duct 14 when the blades 11, 12 are so positioned, system pressure builds up almost immediately to the supply pressure level on the upstream side of the damper, and the resulting static pressure rise is applied through the inlet ports 45 to the chambers 47 inside each blade, and also is applied to the insides of the tubes through the aligned ports 43 and 44 in the locking ribs and the tubes. Accordingly, the pistons 39 and 40 of both end sealing elements 38 of each blade are subjected to a pressure differential producing a net extending force for shifting the elements toward the side frame members 13a and pressing the rubs 50, 51 tightly against the frame, and portions of the tubes downstream from the line of contact are simultaneously expanded tightly against each other and against the top and bottom frame members 13b to ensure that the damper is effectively sealed in all respects, as is best shown in FIG. 4.

When the damper 10 is to be opened, the blades 11, 12 are turned from the closed positions in FIGS. 3—5 by an operating force applied by the positioning actuator 20. It will be evident that the sealing pressure exerted from within will produce frictional resistance to the initial opening movement, but this resistance is relieved as soon as a sufficient area is opened through the damper for substantial pressure equalization. Thus, the extending force on the end elements and the expanding force on the tips are terminated, and the blades will turn relatively freely after a slight initial amount of turning.

From the foregoing, it will be seen that the present invention provides a significantly improved damper blade 11, 12 and damper assembly 10 in which system pressure is applied from within each blade, when the damper is closed, to augment the sealing action of the normally close fitting blade tips and blade ends. This is accomplished in a novel manner by forming the tips as expandable walls of longitudinal pressure chambers, making the ends as extendible piston-supported elements movable toward and away from the frame, and applying system pressure through the blades to both the expandable tips and the extendible ends. By reducing the end sealing area to substantial substantially less than the piston area inside the blade, a magnified sealing pressure is obtained at the frame. Moreover, the blade body is of unique configuration lending itself readily to economical mass production and to simple assembly of the damper.

It also will be apparent that, while a particular form of the invention has been illustrated and described, and a particular use has been suggested, various modifications and other uses can be made without departing from the spirit and scope of the invention.

I claim:

1. In a damper assembly for controlling a flow of air or the like through a duct, the combination of:

a frame defining a rectangular opening of predetermined width and mountable in said duct;

a pair of hollow rectangular blades extending across said opening and mounted on said frame to turn about parallel axes from edge-to-edge closed positions in a common plane to open positions in parallel planes, said blades having grooved longitudinal side edges and ends disposed in spaced relation with said frame;

tubes composed of flexible material recessed in an coextensive with said side edges with one side portion of each tube extending beyond the associated side edge to form a curved blade tip;

extension bars between said frame and the ends of said blades, said bars having tips flush with said blade tips, sealing ribs on said bars facing away from the ends of the blades for sealing engagement with said frame along the full width of the blades, and pistons on said bars telescoped longitudinally into said tubes and into said blades with close sliding fits; and means opening through corresponding sides of said blades and communicating therethrough with said tubes and with the interiors of said blades to apply pressure from said duct to said blade tips and said pistons when said assembly is closed, thereby to bulge each blade tip outwardly and extend said bars to press said sealing ribs against said frame.

2. The combination defined in claim 1 in which said blades are mounted by trunnions extending through said bars and into said frame, each said sealing ribs comprising an annular section encircling a trunnion, and a pair of straight sections extending outwardly to the tip of the bar, said sections having surfaces in a common plane for engagement with said frame.

3. The combination defined in claim 1 in which each each of said blades comprises a pair of generally rectangular plates having spaced, converging side edges defining grooves for said tubes, and at least two pairs of interlocking longitudinal webs between said plates, said webs being located adjacent said side edges to form the bottoms of said grooves and having means thereon for interlocking as an incident to the movement of said plates into side-by-side relation.

4. The combination as defined in claim 3 in which said plates are substantially identical and are arranged in inverted relation, each having two pairs of first and second webs with said first webs aligned with said second webs for interlocking in said inverted relation.

5. The combination as defined in claim 3 further including elongated ribs on said plates extending along the axis of each blade and having sides shaped to form a seat of noncircular cross section, and a shaft of said non circular cross section disposed in said seat and extending beyond said blade ends to form trunnions for mounting the blade.

6. A damper for controlling a flow of air or the like through an opening in a damper frame in response to supply pressure on one side of the frame, said damper having, in combination:

at least one damper blade extending across said opening and having ends adjacent said frame, said blade having spaced generally parallel side edges;

means at the ends of said blade supporting the latter on said frame for turning about a longitudinal axis to turn the blade between open and closed positions within said opening;

first sealing elements extending along said edges and including flexible walls capable of bulging outwardly in response to a pressure differential on opposite sides of the walls;

means defining first pressure chambers inside said walls;

second sealing elements extending across the ends of said blade;

pistons mounting said second sealing elements on said blade for longitudinal movement relative to the blade;

means in said blade defining a second pressure chamber, said pistons extending longitudinally into said second chamber; and means on one side of said blade opening into the latter and communicating with said first and second pressure chambers to apply said supply pressure through said blade to said chambers thereby to bulge said flexible walls and extend said pistons and second sealing elements when said blade is in said closed position.

7. A damper as defined in claim 6 in which said first sealing elements are tubes of flexible material secured to said side edges and defining said first chamber.

8. A damper as defined in claim 7 in which said blade has longutudinal grooves in said side edges, said tubes being secured in said grooves with one side portion of each tube extending outwardly beyond said side edges to form an arcuate tip for said blade.

9. A damper as defined in claim 6 in which said second sealing elements comprise extension bars having the same cross section as said blade and including tips aligned with the edges of said blade, and further including sealing ribs on the sides of said bars facing away from said blade extending the full width thereof.

10. A damper as defined in claim 9 in which said supporting means are trunnions projecting longitudinally from the ends of said blade through said bars, said sealing ribs comprising sections extending transversely from said tips toward said trunnions, and an annular portion encircling the trunnions and joining said straight sections together.

11. A damper as defined in claim 9 in which said first sealing elements are tubes of flexible material disposed in longitudinal grooves in said side edges and defining said first chambers, each tube having one side extending beyond the associated groove to form an arcuate blade tip.

12. A damper as defined in claim 11 in which said pistons include two studs extending into said tubes from each of said bars, and at least one block extending into said blade from each bar and into said second chamber with a close sliding fit, whereby said bars are movable longitudinally of the blade in response to pressure applied to said pistons within said chambers.

13. In a damper for controlling a flow of air or the like through an opening defined in part by side members spaced a predetermined distance apart, a damper blade comprising:

an elongated, generally flat body shorter than said predetermined distance, said body having parallel side edges forming blade tips and opposite ends disposed adjacent said side members;

means on said ends for mounting said body on said side members to turn about a longitudinal axis between open and closed positions;

means in said body defining at least one internal pressure chamber having an inlet port opening through one side of said body to be pressurized by said air when said blade is in said closed position;

flexible edge sealing elements extending along said blade tips and arranged to bulge outwardly in response to pressure from within; and end sealing elements mounted on the ends of said body and constituting longitudinal extensions of the latter, said sealing elements including pistons telescoped longitudinally into said body and into said chamber, and having end surfaces facing away from the body and formed with seals for engaging said side members, said end sealing elements normally being closely adjacent said side members and being extendible relative to said body to be sealed against said side members by pressure acting on said pistons from within said chambers.